INVENTOR
J. H. Beard
BY
Holcomb, Wetheull + Brunton
ATTORNEYS

INVENTOR
J. H. Beard
BY
Holcomb, Wetherill & Brisebois
ATTORNEYS

United States Patent Office 3,340,582
Patented Sept. 12, 1967

3,340,582
MOULDING PRESS
Jack Herbert Beard, Sheffield, England, assignor to Davy and United Engineering Company Limited, Sheffield, England
Filed June 25, 1965, Ser. No. 466,884
8 Claims. (Cl. 25—66)

This invention relates to a moulding press.

For making grinding wheels or the like the mould material must be compacted in the mould and then ejected therefrom before further heat treatment.

In one aspect the present invention provides a moulding press in which the mould assembly is arranged to be carried on a support table, clamping means for clamping the mould band to a fixed foundation, and means for raising the mould base to eject a pressing from the mould assembly. By clamping the mould band to a fixed foundation during ejection the support table is relieved of the ejection loads.

In a preferred form the invention provides a moulding press comprising a plurality of operating stations, a rotatable support table arranged to carry a plurality of mould assemblies at equiangularly spaced intervals, the mould assemblies being free to move upwards from the support table, means for rotating the table to move the assemblies through the plurality of operating stations in sequence, one of the stations being an ejector station including a piston and cylinder assembly arranged beneath the table to act upwards on the mould base of a mould assembly at that station, and means for clamping the mould bank to a fixed foundation.

At the pressing station a precompacting cylinder and ram assembly may be arranged beneath the rotatable table to act upwards on the mould base.

Embodiments of mould presses, in accordance with the invention, will now be described, by way of example only, with reference to the accompanying drawings of which:

Figure 1:
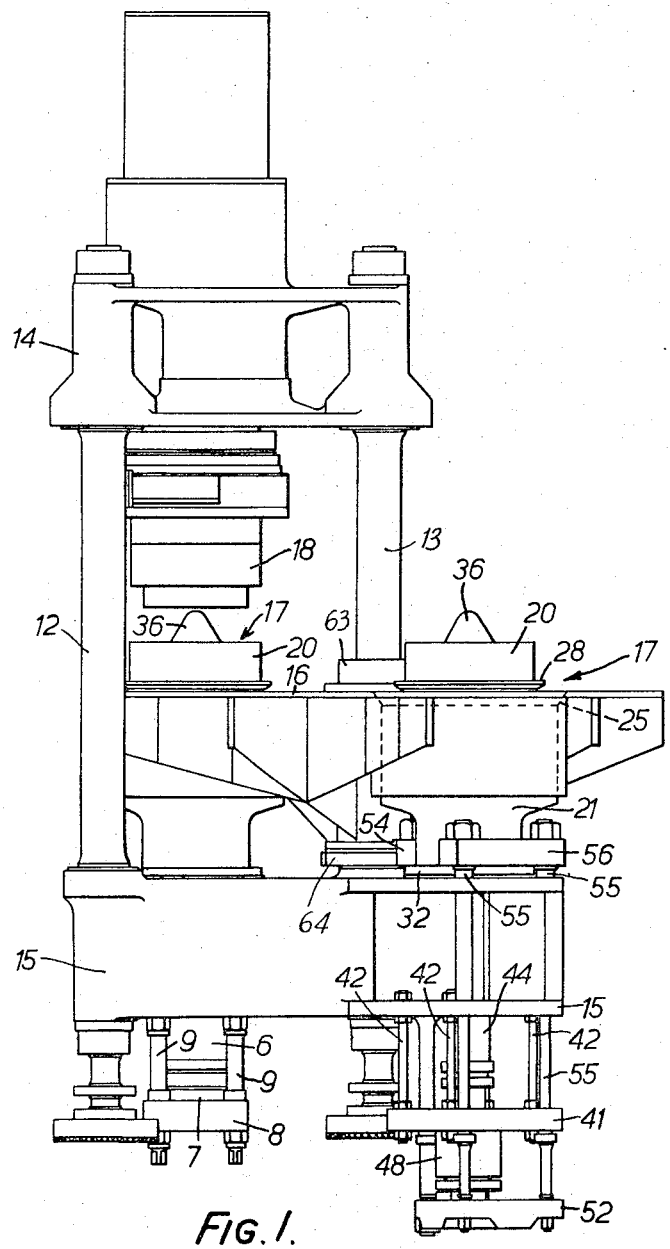
FIGURE 1 is a side elevation of a moulding press.

The press is of three column form, only two columns 12, 13 being seen in FIGURE 1, the other column being located behind column 12 as viewed in the figure. The columns are connected by an upper crosshead 14 and a lower crosshead 15. A rotatable support table 16 is mounted for rotation about column 13 on an upper bearing 63 and a lower bearing 64, and carries three similar mould assemblies 17, only two of which are seen in FIGURE 1, the left hand one being at the pressing station and the right hand one being at an ejector station. The mould assemblies 17 are spaced at 120° intervals so that they are rotatable together in sequence through feed, pressing, and ejector stations.

At the pressing station a double-acting hydraulic cylinder and ram assembly 18 is provided above the mould position, for compacting mould material within the mould band 20. Also at the pressing position a precompacting reciprocable cylinder 6 is mounted on a ram 7 secured to a fixed crosshead 8 carried by the bars 9 from the fixed crosshead 15. The cylinder 6 is arranged to be driven upwards to exert an upwardly directed force on the base of the mould, without acting on the mould band.

Figure 2:
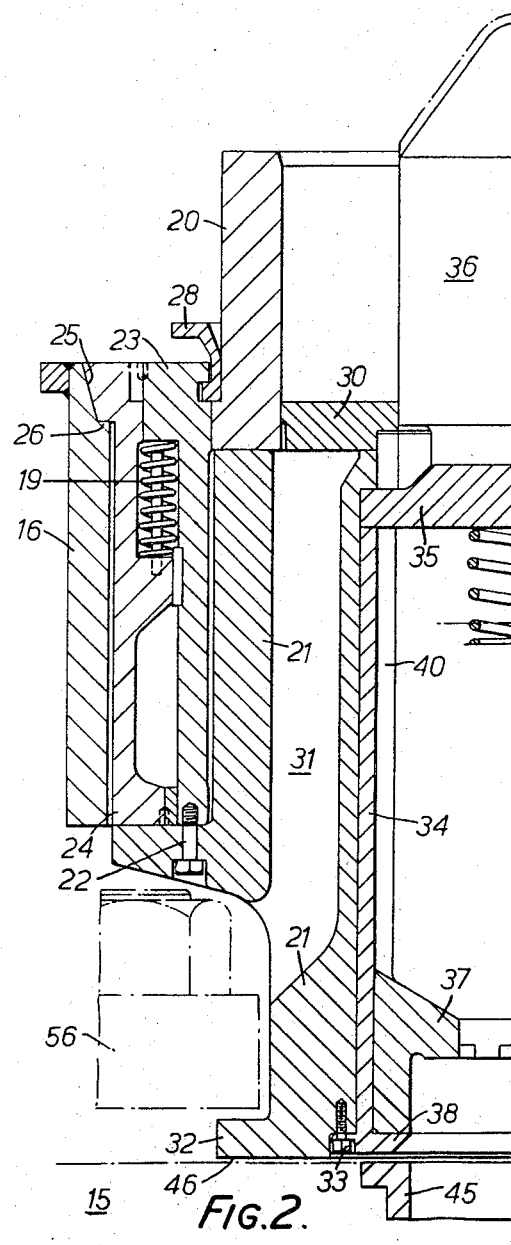
FIGURE 2 is a vertical section through one mould assembly of the press.

As seen more clearly in FIGURE 2 each mould assembly comprises a matrix body 21 bolted by bolts 22 to a ring 23, which in turn is supported by springs 19 on an outer ring 24 having an upper outwardly projecting flange 25 which rests on a corresponding inwardly projecting flange 26 of the rotatable table 16. The matrix body and ring 24 are thus supported on the support table but are free to move upwards. The mould band 20 rests on the matrix body and is prevented from upward movement relative thereto by a ring 28, since a lower shoulder of the band 20 abuts a lower flange of the ring 28 which is received in a recess in the ring 23. A mould base 30 is supported on the matrix body 21. Passages 31 are provided in the matrix body to allow moulding material which filters past the edge of the mould base to escape. The matrix body also serves to transmit any downward load, during pressing, on the base 30 to the crosshead 15. The base of the matrix body is provided with an outwardly projecting clamping flange 32. The matrix body is hollow and has secured to its inner surface by bolts 33 a sleeve 34. A spider member 35 is clamped between the upper surface of the sleeve 34 and the matrix body 21, and supports a central plug 36. A central ring 37 is supported on an inwardly projecting flange 38 of the sleeve 34, and has upwardly projecting arms 40 which pass between the arms of the spider 35 and terminate immediately below the mould base 30. Movement upwards of the ring 37 thus raises the mould base 30.

Figure 3:
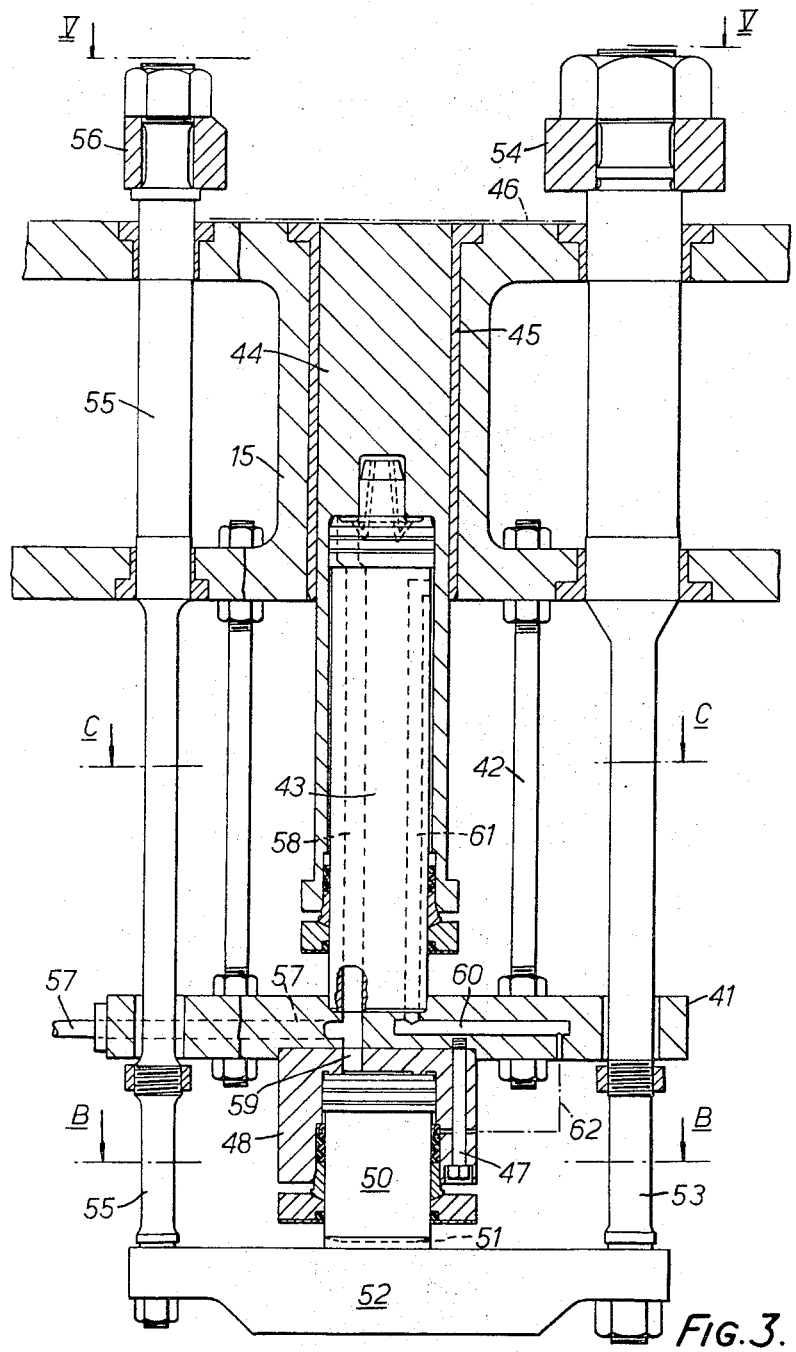
FIGURE 3 is a vertical section, taken on the line III—III of FIGURE 4, showing the ejector mechanism of the press.
Figure 4:
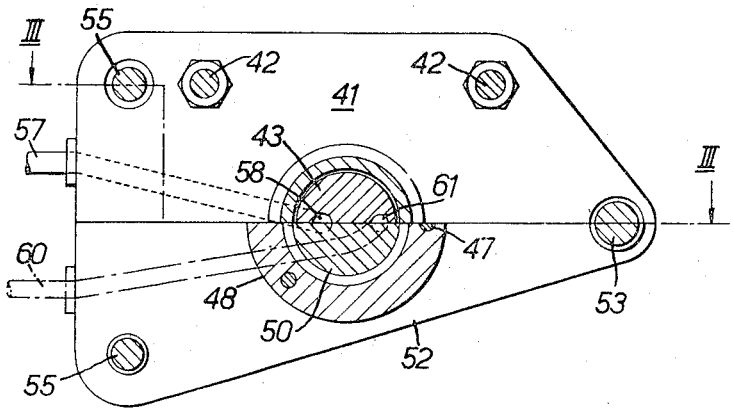
FIGURE 4 is a horizontal section through the ejector assembly, the upper half of the figure being taken on the line C—C of FIGURE 3 and the lower half of the figure being taken on the line B—B of FIGURE 3.
Figure 5:
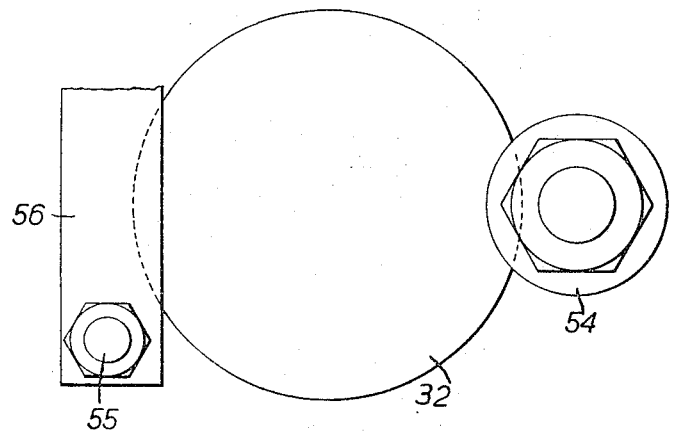
FIGURE 5 is a horizontal section taken on line V—V of FIGURE 3.

The ejector mechanism is seen most clearly in FIGURE 3 which is a view from the right of the lower part of the apparatus shown in FIGURE 1, and in FIGURES 4 and 5 and comprises a fixed crosshead 41 suspended from the crosshead 15 by tie-bars 42. An ejector piston 43 is secured to and projects upwardly from the fixed crosshead 41 and carries an ejector cylinder 44 which is slidable in a guide bush 45, which can be replaced when worn, in the crosshead 15. In its lowest position, illustrated in FIGURE 3, the top of the ejector cylinder terminates just below the underside 46 of the matrix body of the mould assembly. Secured to the underside of the fixed crosshead 41 by bolts 47 is a clamp cylinder 48. A clamp piston 50 is located in the clamp cylinder and acts through a part spherical seating 51 on a moving crosshead 52. At one side of the assembly a clamp rod 53 has its lower end secured to the moving crosshead 52, passes through the fixed crossheads 41 and 15 and at its upper end carries a circular section clamping bar 54. Similarly at the other side of the ejector mechanism a pair of clamping rods 55 at their upper ends carry a clamp bar 56. In their uppermost position, illustrated in FIGURE 3, the clamp bars 54 and 56 have their lower surfaces overlapping but clearing the upper surfaces of the clamping flange 32 of the matrix body of a mould. Thus on rotation of the table 16 about the column 13 a mould can be swung into position with the clamping flange 32 above the level of the upper surface of the ejector cylinder and just below the overlapping edges of the clamp bars. A high pressure oil inlet 57 is provided in a fixed crosshead and connects with passages 58, 59 through the ejector piston rod 43 and the clamp cylinder 48 respectively. Introduction of high pressure oil into the inlet 57 forces the ejector cylinder upwards to act on ring 37 and push the mould base up to eject a pressing and at the same time acts on clamp piston 50 to lower the moving cross head 52, the clamp rods and the clamp bars to clamp the matrix body against upward movement. During the clamping a small movement occurs to bring the flange 32 into contact with the crosshead 15 and this movement is taken up by the springs 19 so that it is not transmitted to the table 16. The pressure acts over a larger area on piston 50 than on the ejector cylinder so that the clamping force is always greater than the ejection force; in this way the clamping arrangement removes from the rotatable table the upward thrust due to friction between the pressing and the mould wall during ejection. A further high pressure oil inlet 60 is provided in the fixed crosshead 41 and communicates with the ejector cylinder and the clamp cylinder via passages 61, 62 respectively, so that supply of oil to the passage 60 forces the ejector cylinder down and the clamping bars up.

I claim:

1. A moulding press comprising a plurality of fixed columns connected by a fixed crosshead, a plurality of operating stations, a rotatable support table, a plurality of similar mould assemblies arranged at equiangularly spaced intervals on the support table, the mould assemblies being free to move upwards from the support table, each mould assembly having a mould band and a mould base movable in the mould band, means for rotating the table to move the assemblies through the plurality of operating stations in sequence, one of the stations being an ejector station including an ejector piston and cylinder assembly arranged beneath the table to act upwardly on the mould base of a mould assembly at that station, and means independent of the table for clamping the mould band of the assembly at said ejector station to said fixed crosshead, said mould assembly having a projecting clamping flange beneath the support table, in a position to be engaged by the clamping means to resist upward movement during ejection.

2. A moulding press according to claim 1 in which each mould assembly comprises a hollow body member supported on the rotatable table, the mould band being secured to the body member, and a vertically movable member extending from near the bottom of the mould assembly up to the mould base.

3. A moulding press according to claim 2 in which the ejector piston and cylinder assembly is arranged to engage the vertically movable member to move the mould base upwards.

4. A moulding press according to claim 2 in which the means for clamping the mould band to the fixed foundation includes clamping devices arranged above the clamping flanges of the mould assembly at the ejector station.

5. A moulding press according to claim 4 in which the clamping devices comprise vertically movable clamping bars, and means for moving the clamping bars downwards from an upper inoperative position to a lower operative position in which they engage the clamping flange of the mould assembly.

6. A moulding press according to claim 5 in which the means for moving the clamping bars downwards comprise a piston and cylinder assembly adapted to be powered at the same time as the ejector piston and cylinder assembly and to exert a greater clamping force than the ejector force.

7. A moulding press comprising a stationary foundation, a table mounted for rotation in a substantially horizontal plane, a plurality of mould assemblies carried by said table for movement between a plurality of positions relative to said foundation, each mould assembly comprising a mould band and a mould base vertically movable within said band, means for clamping to said foundation the mould band of an assembly at one of said positions, and means independent of the table for raising the mould base of the assembly at said one position to eject a pressing from that assembly while the mould band thereof is clamped, said mould assembly having a projecting clamping flange beneath the support table positioned to be engaged by the clamping means to resist upward movement during ejection.

8. The moulding press according to claim 7 comprising a pressing station at which a precompacting cylinder and ram are arranged beneath the rotatable table to act upward on the mould base.

References Cited

UNITED STATES PATENTS

| | | | |
|---|---|---|---|
| Re. 25,441 | 9/1963 | Eyberger | 18—2 XR |
| 917,748 | 4/1909 | Burton | 25—69 |
| 1,309,128 | 7/1919 | Gammeter | 18—2 XR |
| 1,331,792 | 2/1920 | Winder et al. | |
| 1,336,579 | 4/1920 | Oxley | 25—69 |
| 1,599,151 | 9/1926 | Vought | 25—69 |
| 1,609,701 | 12/1926 | Doty | 18—2 |
| 1,911,011 | 5/1933 | Brotz | 25—27 XR |
| 2,470,638 | 5/1949 | Parmelee et al. | 25—24 |
| 2,536,364 | 1/1951 | Guy et al. | 25—24 |
| 2,543,292 | 2/1951 | Kany | 25—2 |
| 2,560,980 | 7/1951 | Pettersen | 25—24 |
| 2,859,502 | 11/1958 | Brown | 25—2 |
| 3,103,729 | 9/1963 | Flamand | 25—120 XR |
| 3,129,462 | 4/1964 | Borah | 18—2 XR |
| 3,137,905 | 6/1964 | Steinman et al. | 18—2 XR |
| 3,142,106 | 7/1964 | Wise et al. | 25—120 |
| 3,197,825 | 8/1965 | Hammond | 18—2 XR |

WILLIAM J. STEPHENSON, *Primary Examiner.*